US012729793B2

(12) United States Patent
Gill et al.

(10) Patent No.: US 12,729,793 B2
(45) **Date of Patent: *Sep. 8, 2026**

(54) FITTING COLLAR AND TUBE-FITTING ASSEMBLIES INCORPORATING FITTING COLLARS

(71) Applicant: AVTECHTYEE INC., Everett, WA (US)

(72) Inventors: Justin Edward Gill, Everett, WA (US); Daniel L. Moore, Edmonds, WA (US); Glenn B. Newell, Marysville, WA (US)

(73) Assignee: AVTECHTYEE INC., Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/282,976

(22) Filed: Jul. 28, 2025

(65) Prior Publication Data

US 2025/0354643 A1 Nov. 20, 2025

Related U.S. Application Data

(60) Continuation of application No. 18/593,616, filed on Mar. 1, 2024, now Pat. No. 12,372,188, which is a continuation of application No. 17/548,419, filed on Dec. 10, 2021, now Pat. No. 11,940,076, which is a continuation of application No. 17/344,669, filed on Jun. 10, 2021, now Pat. No. 11,927,291, which is a division of application No. 15/616,406, filed on Jun. 7, 2017, now Pat. No. 11,041,585.

(60) Provisional application No. 62/347,513, filed on Jun. 8, 2016.

(51) Int. Cl.

| | |
|---|---|
| ***F16L 47/14*** | (2006.01) |
| ***B21D 39/04*** | (2006.01) |
| ***C08L 63/00*** | (2006.01) |

(52) U.S. Cl.
CPC .............. *F16L 47/14* (2013.01); *B21D 39/04* (2013.01); *C08L 63/00* (2013.01)

(58) Field of Classification Search
CPC ......... F16L 47/12; F16L 47/14; F16L 37/123; F16L 37/138
See application file for complete search history.

(56) References Cited

U.S. PATENT DOCUMENTS

| | | | |
|---|---|---|---|
| 36,410 | A | 9/1862 | Jucket |
| 2,594,693 | A | 4/1952 | Smith |
| 3,899,006 | A | 8/1975 | Champleboux et al. |
| 3,920,049 | A | 11/1975 | Lippert et al. |
| 4,065,339 | A | 12/1977 | Lippert et al. |

(Continued)

FOREIGN PATENT DOCUMENTS

| | | |
|---|---|---|
| EP | 0 907 049 A2 | 4/1999 |
| EP | 3 273 131 A1 | 1/2018 |

(Continued)

OTHER PUBLICATIONS

European Search Report issued in corresponding European Application No. 17175097.9, issued Dec. 21, 2017, 8 pages.

(Continued)

*Primary Examiner* — Matthew Troutman
*Assistant Examiner* — Fannie Kee
(74) *Attorney, Agent, or Firm* — Womble Bond Dickinson (US) LLP

(57) ABSTRACT

A collar for applying a radial compressive force to an outer surface of a tube and a tube assembly including the collar and the tube.

17 Claims, 6 Drawing Sheets

(56) References Cited

U.S. PATENT DOCUMENTS

| | | | |
|---|---|---|---|
| 4,330,016 | A | 5/1982 | Grendelman |
| 4,339,158 | A | 7/1982 | Greener et al. |
| 4,385,644 | A | 5/1983 | Kaempen |
| 4,786,536 | A | 11/1988 | Kaempen |
| 4,792,320 | A | 12/1988 | Nickel |
| 4,849,152 | A | 7/1989 | Rumberger |
| 4,932,689 | A | 6/1990 | Bradley |
| 5,318,374 | A | 6/1994 | Rumberger |
| 6,155,610 | A | 12/2000 | Godeau et al. |
| 7,922,212 | B2 | 4/2011 | Werth |
| 7,922,213 | B2 | 4/2011 | Werth |
| 8,205,315 | B2 | 6/2012 | Mullen et al. |
| 9,227,375 | B2 | 1/2016 | Carrere et al. |
| 11,041,585 | B2 | 6/2021 | Gill et al. |
| 2008/0157519 | A1 | 7/2008 | Mullen et al. |
| 2018/0297292 | A1 | 10/2018 | Batten et al. |

FOREIGN PATENT DOCUMENTS

| | | |
|---|---|---|
| JP | H0610215 | 1/1994 |
| WO | WO2008/057405 A1 | 5/2008 |

OTHER PUBLICATIONS

Office action issued in corresponding European Application No. 17175097.9, issued Jan. 14, 2019, 4 pages.

Office action issued in corresponding European Application No. 17175097.9 on Jan. 2, 2020, 4 pages.

Japanese Search Report issued in corresponding Application JP106119099, dated Jun. 5, 2020, 1 page.

Japanese Office action issued in corresponding Application JP106119099, dated Jun. 5, 2020, 11 pages.

1500,1504
1502,1506
d
d'
10
104
19
218
11
312
150
1225
126
1231
1224
1222
1227
1228
1226
12
1284
1235
1240

10
104
304
334
402
406
150
400
408
404
19
218
302
332
330
300
11

10
304
338
334
406
408
218
302
332
330
300
11

FITTING COLLAR AND TUBE-FITTING ASSEMBLIES INCORPORATING FITTING COLLARS

CROSS-REFERENCE TO RELATED APPLICATIONS

This application is a continuation of U.S. patent application Ser. No. 18/593,616, filed on Mar. 1, 2024, and issued as U.S. Pat. No. 12,372,188 on Jul. 29, 2025, which is a continuation of U.S. patent application Ser. No. 17/548,419, filed on Dec. 10, 2021, and issued as U.S. Pat. No. 11,940,076 on Mar. 26, 2024, which is a continuation of U.S. patent application Ser. No. 17/344,669, filed on Jun. 10, 2021, and issued as U.S. Pat. No. 11,927,291 on Mar. 12, 2024, which is a divisional of U.S. patent application Ser. No. 15/616,406, filed on Jun. 7, 2017, and issued as U.S. Pat. No. 11,041,585 on Jun. 22, 2021, which claims the benefit and priority of U.S. Provisional Application No. 62/347,513, filed on Jun. 8, 2016, the contents of all of which are fully incorporated herein by reference.

BACKGROUND OF THE INVENTION

Fittings are mounted to a tube end by being inserted into the tube end and attached to an inner surface of the tube. A collar is typically placed over the tube end to “clamp” the tube to the fitting. The holding strength between the tube and the fitting is often inconsistent leading to permanent failures. Thus, collars able to provide for more consistent holding strength between the tubing and the fitting so that the tubing and fitting interface can withstand loads more consistently are desired.

SUMMARY

In an example embodiment, a tube assembly includes a fitting having a first end opposite a second end, at least a section of the fitting having an annular outer tapered surface reducing in diameter in a direction axially toward the first end, a tube having a portion over the annular outer tapered surface, the portion of the tube having an outer surface reducing in diameter in a direction axially toward the first end, and an annular collar having an inner surface over the portion of the tube outer surface, wherein the collar in cross-section as viewed along a plane extending axially along a diameter of the collar includes a generally triangular section and an outer section over the generally triangular section. The triangular section defines a tapered inner surface of the collar reducing in diameter axially in a direction toward the first end. The collar includes a fiber reinforced composite material including fibers and resin. Substantially all fibers forming the triangular section are axially oriented. The tapered inner surface of the collar is linear or non-linear. In another example embodiment, the outer section includes fibers oriented generally transverse to the axial direction. In yet another example embodiment, the outer section includes fibers oriented generally perpendicular to the axial direction. In a further example embodiment, the outer section is a generally rectangular section when viewed along the plane. In one example embodiment, the collar includes a first end axially opposite a second end. The generally triangular and outer sections extend to the second end and only the outer section extends to the first end and defines a portion of the inner surface of the collar. In further example embodiment, the collar further includes a third section radially between the generally triangular and the generally rectangular section. In yet a further example embodiment, the collar inner surface includes two tapered surface portions tapered at different angles in cross-section as measured from the plane. A first of the two tapered surface portions is the tapered inner surface portion and the second of the two tapered surface portions is defined on the third section. In one example embodiment, the portion of the tube outer surface reducing in diameter is a first outer surface section, and the tube includes a second outer surface section reducing in diameter in a direction axially toward the first end. The first outer surface section is between the second outer surface section and the first end, and the second outer surface section reduces in diameter at a steeper angle than the first section. At least substantially all of the fibers in the collar third section are substantially axially oriented. In another example embodiment, the tube first outer surface section interfaces with the collar first tapered surface portion and the tube second outer surface section is spaced apart from the collar second tapered surface portion. In yet another example embodiment, the tube first outer surface section interfaces with the collar first tapered surface portion and the tube second outer surface section interfaces with the second tapered surface portion. In a further example embodiment, a portion of the collar outer section interfaces with an outer surface of the tube. In yet a further example embodiment, the fitting includes a radially extending flange and the generally triangular section of the collar interfaces with the flange and the outer surface of the tube reducing in diameter. In an example embodiment, the filler section is formed separately from the outer section and the two sections are adhered together after they are formed to form the collar.

In an example embodiment, an annular collar for applying a radial compressive force to an outer surface of a tube includes a first end axially opposite a second end, and. The annular collar further includes in cross-section as viewed along a plane extending axially along a diameter of the collar, a generally triangular section and an outer section over the generally triangular section. The generally triangular section defines a tapered inner surface of the collar reducing in diameter axially in a direction toward the first end. The collar includes a fiber reinforced composite including fibers and resin, and substantially all fibers forming the triangular section are axially oriented. The tapered inner surface of the collar may be linear or non-linear. In another example embodiment, the outer section includes fibers oriented generally transverse to the axial direction. In yet another example embodiment, the outer section includes fibers oriented generally perpendicular to the axial direction. In a further example embodiment, the outer section is a generally rectangular section when viewed along the plane. In yet a further example embodiment, the generally triangular and outer sections extend to the second end, and only the outer section extends to the first end. With this example embodiment, the outer section defines a portion of the inner surface of the collar. In yet a further example embodiment, the collar further includes a third section radially between the generally triangular and the generally rectangular sections. In one example embodiment, the collar tapered inner surface includes two tapered surface portions tapering at different angles in cross-section as measured along an axially extending plane. A first of the two tapered surface portions are the tapered inner surface portion and a second of the two tapered surface portion is defined on the third section. In an example embodiment, the filler section is formed separately from the outer section and the two sections are adhered together after they are formed to form the collar.

In an example embodiment, an annular collar for applying a radial compressive force to an outer surface of a tube includes a first end axially opposite a second end, and an inner surface. The collar in cross-section as viewed along a plane extending axially along a diameter of the collar includes a generally triangular section and an outer section over the generally triangular section. The generally triangular section defines a tapered inner surface of the collar reducing in diameter axially in a direction toward the first end. The collar includes a fiber reinforced composite including fibers and resin, and substantially all fibers forming the triangular section are axially oriented. The tapered inner surface of the collar may be linear or non-linear. In another example embodiment, the collar outer section includes fibers oriented generally transverse to the axial direction. In yet another example embodiment, the outer section includes fibers oriented generally perpendicular to the axial direction. In a further example embodiment, the outer section is a generally rectangular section as viewed along the plane. In yet a further example embodiment, the generally triangular and outer sections extend to the second end and only the outer section extends to the first end. With this example embodiment, the outer section defines a portion of the inner surface of the collar. In yet a further example embodiment, the collar further includes a third section radially between the generally triangular and the generally rectangular sections. In one example embodiment, the collar tapered inner surface includes two tapered surface portions tapering at different angles in cross-section as measured along an axially extending plane. A first of the two tapered surface portions are the tapered inner surface portion and a second of the two tapered surface portions is defined on the third section.

In an example embodiment a method for coupling a fitting to a tube end includes inserting the fitting into the tube end such that a portion of the tube surrounds the fitting. The portion of the tube surrounding the fitting includes an outer surface that reduces in diameter in a direction toward the tube end. The method also includes pressing with a predetermined axial load, a collar having a tapered inner surface over the outer surface of the tubing such that the tapered inner surface engages the tube outer surface. The predetermined axial load positions the collar at an appropriate location over the tube.

In another example embodiment a method for coupling a fitting to a tube end includes inserting the fitting into the tube end such that a portion of the tube surrounds the fitting. The portion of the tube surrounding the fitting includes an outer surface that reduces in diameter in a direction toward the tube end. The method also includes pressing a collar having a tapered inner surface over the outer surface of the tubing such that the tapered inner surface emerges the outer surface of the tubing. The collar is pressed with an axial load until the strain on the collar in the hoop direction is at a predetermine level. In yet another example embodiment, the strain on the collar in the hoop direction is at the predetermined level when the hoop stress on the collar is at least 50% of the ultimate hoop stress of the collar. In a further example embodiment, the strain on the collar in the hoop direction is measured using a strain gauge mounted on the collar.

DESCRIPTION

In the following detailed description, certain example embodiments are shown and described, by way of illustration. As those skilled in the art would recognize, the described example embodiments may be modified in various ways, all without departing from the spirit or scope of the present invention. Accordingly, the drawings and description are to be regarded as illustrative in nature, rather than restrictive.

Figure 1:
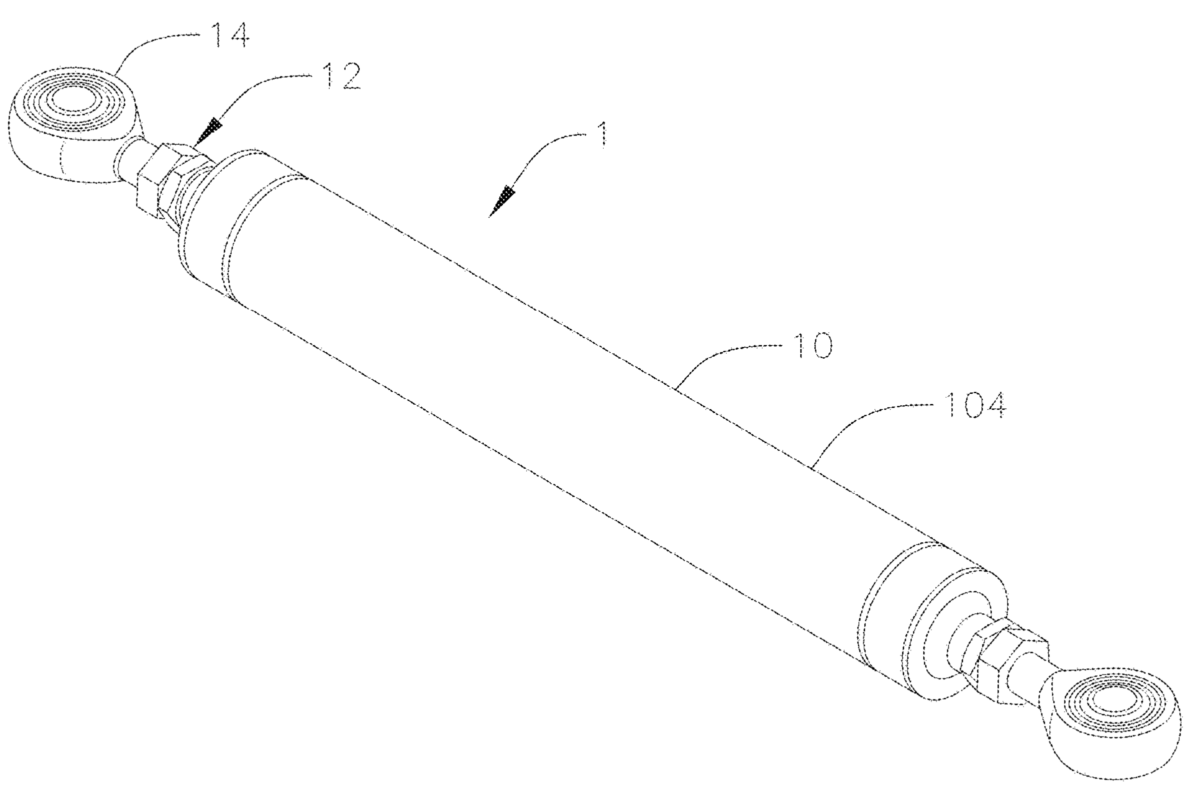
FIG. 1 is a perspective view of an example embodiment tube assembly including a tube with two fittings mounted at its opposite ends of an example embodiment.
Figure 2:
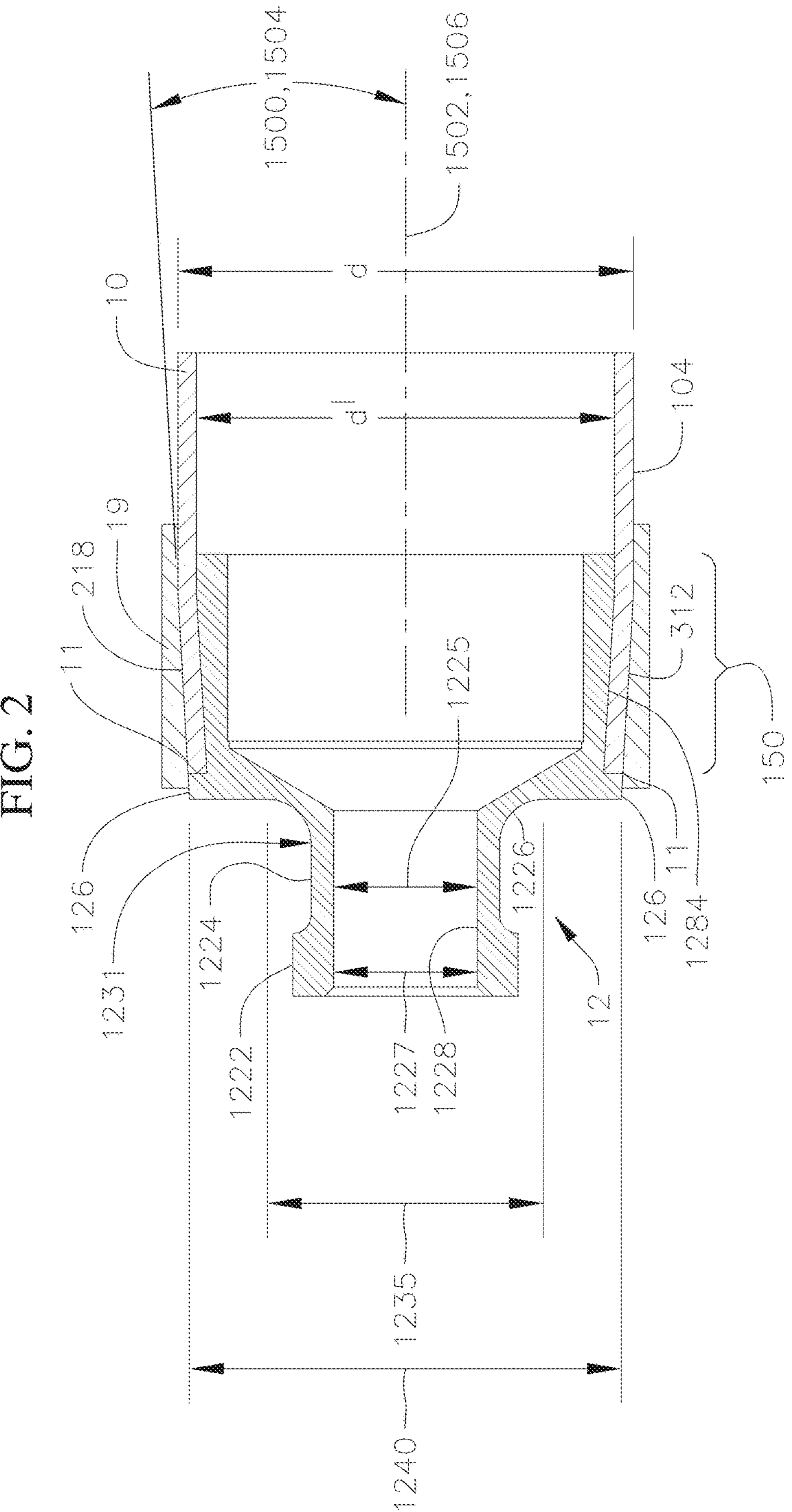
FIG. 2 is a partial cross-sectional view of a fitting mounted into an end of the tube with an example embodiment collar over the tube.

With reference to FIG. 1, a composite tube assembly 1, according to an embodiment of the present invention, includes a composite tube 10. A fitting (i.e., insert) 12 and an end fitting 14 are located at each end of the composite tube 10. The composite tube 10 is a hollow and substantially tubular structure. With reference to FIGS. 1 and 2, the composite tube 10 has a body 104 having a substantially uniform outer diameter d and a substantially uniform inner diameter d'.

The composite tube 10 may be produced by winding composite fibers in a form of a filament (and/or a tape) having an epoxy resin over a tubular mandrel. Any of a number of suitable machines known to those skilled in the art can be used for this purpose. The composite tube may be a fiber reinforced composited formed with a thermoset or a thermoplastic resin. In other example embodiments, the composite tube may be a liquid molded tubing that may include fiber reinforcement. The composite fibers may be wound along a direction that is substantially helical with respect to a longitudinal axis of the composite tube 10. In one embodiment, the composite fibers are wound at a very small helical angle (or angles) with respect to the longitudinal axis. However, embodiments of the composite tube 10 are not limited thereto. That is, the composite tube 10 may be produced by winding filaments and/or pre-impregnated composite tapes in any known manner. The composite tube may include fibers oriented in multiple directions.

To form the tube assembly, the composite tube 10 if longer than desired (e.g., for a given application), is shortened at either one or both ends. A cutter such as an abrasive cutter or any other suitable instrument may be used for this purpose.

Figure 3:
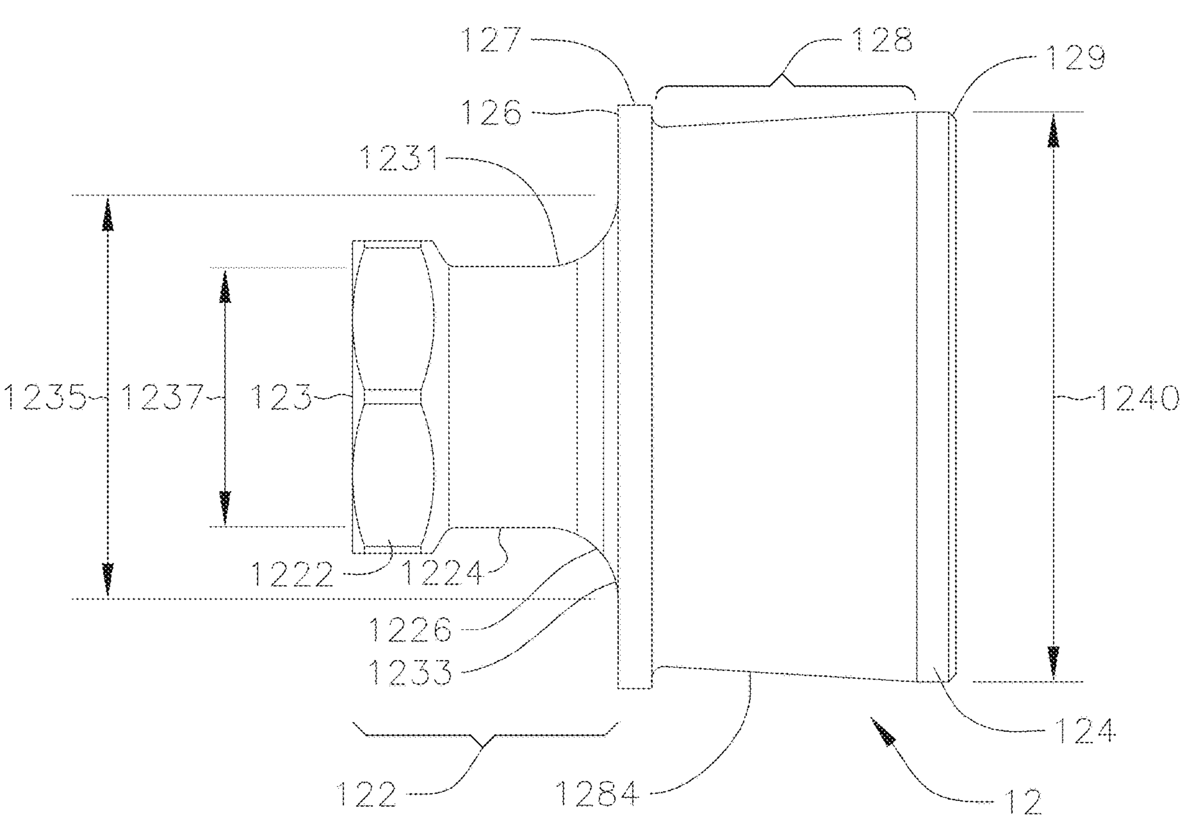
FIGS. 3 and 4 are end views of example fittings.

With reference to FIGS. 2 and 3, each fitting 12 has a first end portion 122, a second end portion 124, and a flange (or abutment) 126 located between the first end portion 122 and the second end portion 124. The fitting 12 further has a third portion 128 which includes a tapered outer surface section

Figure 4:
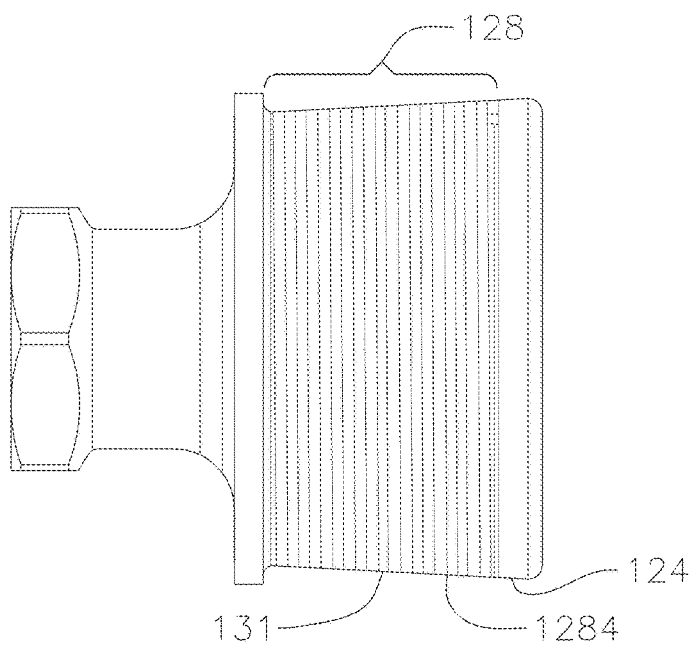

1284 located between the flange 126 and the second end portion 124. Example fittings are described in U.S. Pat. No. 8,205,315, the contents of which are fully incorporated herein by reference. In the example embodiment fittings shown in FIGS. 3 and 4, the tapered outer surface section 1284 occupies almost the entire third portion 128.

The first end portion 122 includes an entry portion 1222, a cylindrical portion 1224 and an annular tapered portion 1226. The entry portion 1222 in one example embodiment has a bore 123 having internal screw threads 1228. The threads 1228 extend from an open end of the entry portion 1222 along the length of the entry portion 1222 towards the cylindrical portion 1224. As such, the entry portion 1222 may be embodied by a jam nut having a hexagonal outer circumference and a circular, internally threaded inner circumference.

The cylindrical portion 1224 is located between the entry portion 1222 and the annular curving portion 1226. The cylindrical portion 1224 has an inner diameter 1225 substantially equal to an inner diameter 1227 of the entry portion 1222. In one embodiment, at least a portion of the bore 123 of the cylindrical portion 1224 is threaded with threads 1228. In one embodiment, the bore 123 of the cylindrical portion 1224 is substantially unthreaded.

The annular curved portion 1226 is located between the cylindrical portion 1224 and the flange 126. A first end 1231 of the annular curved portion 1226 extends to the cylindrical portion 1224. A second end 1233 of the annular curved portion 1226 is flared and extends the flange 126. The second end 1233 of the annular tapered portion 1226 has an outer diameter 1235 larger than the outer diameter 1237 of the cylindrical portion 1224. The flange 126 has a substantially annular shape. An outer diameter 1240 of the flange 126 is larger than the outer diameter 1235 of the annular curved portion 1226 second end. With reference to FIG. 2, the outer diameter of the flange 126 may be substantially equal to the outer diameter d of the body 104 of the composite tube 10. In another embodiment, the outer diameter of the flange 126 is greater (or less) than the outer diameter d of the body 104 of the composite tube 10.

In an example embodiment, the tapered outer surface section 1284 tapers from a larger diameter to a smaller diameter in an axial direction toward the flange. In an example embodiment, the taper of the tapered outer surface section is linear. In an example embodiment, an end portion 124 of the fitting extending to the free end 129 is not tapered and is flat (i.e., has a constant outer surface diameter) as for example shown in FIG. 3. In another example embodiment, the end portion 124 also has a tapered outer surface. In one example embodiment, the tapered outer surface 1284 of the embodiment is linear and the tapered outer surface of the end section is linear and tapers at the same angle as the tapered outer surface of the third portion so as to form one continuous tapered outer surface. This end portion serves to guide the fitting within the tube during assembly when the fitting is being inserted into the tube in an effort to prevent the fitting from canting relative to the tube.

An adhesive may be applied on the tapered area of the fitting and/or to the inner surface of the composite tube end portion which will interface with the fitting. The fitting is then fitted into an end 11 of the composite tube. In an example embodiment, the fitting is pushed in until the end of the composite to abut the flange 126. The end of the tube is then heated to a temperature sufficient for becoming thermoplastic or moldable, i.e., a temperature sufficient to soften the resin such that it can be molded to the tapered surface. When the heated end molded portion cools, it compresses radially against the fitting tapered outer surface and bonds to the outer surface. With this example embodiment, Applicants discovered that due to the linear taper of the surface, the end of the tube does not have to be axially slotted to allow for the tube to engage the tapered surface. Moreover, Applicants have discovered that the tube shrinks well enough on the tapered surface without folding over itself during cooling. In an example embodiment, the tapered surface of the fitting may be grooved with parallel grooves 131 or by a helical groove 131, as for example shown in FIG. 4. The grooves accommodate the softened resin from the composite tube and/or an adhesive if used, thus, allowing for a stronger bond between the composite tube and the fitting. The spacing and the depth of the grooves are chosen to optimize the bond between the fitting and the tube by accommodating a proper amount of resin and/or adhesive.

Figure 5:
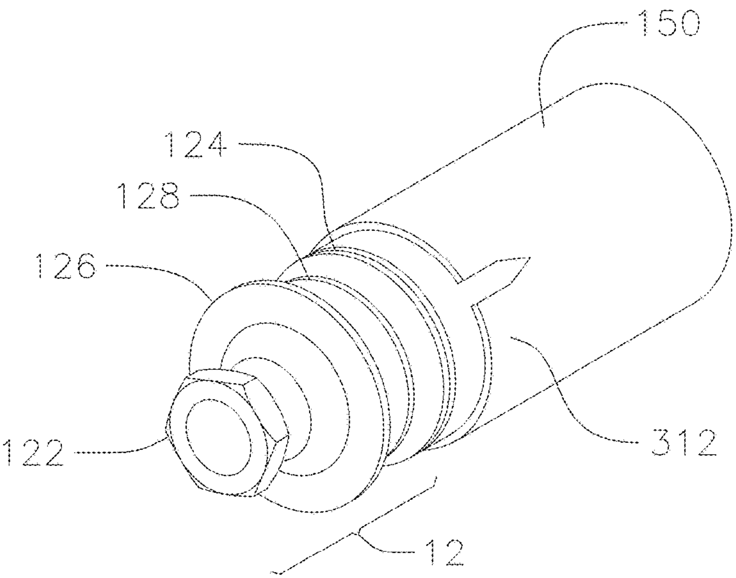
FIG. 5 is an exploded view of an example fitting inserted into a tube end.

With reference to FIG. 5, the second end section 124 and the third portion 128 of the fitting 12 are inserted into an end of the composite tube 10 until the flange 126 of the fitting 12 abuts the end of the composite tube 10. In an example embodiment, prior to the insertion of the third portion 128 and the second end portion 124 into the composite tube 10, the corresponding end of the composite tube 10 is axially notched at one or more portions of the tube to facilitate, as will be described in more detail below, an engaging of the composite tube 10 with the third portion 128 of the fitting 12. A water jet or any other suitable instrument may be used for this purpose.

In a further example embodiment, the third portion 128 of the fitting 12 is coated with an adhesive prior to the insertion of the third portion 128 and the second end portion 124 into the composite tube 10. Alternatively, the inner surface portion of the end portion 150 of the composite tube that will interface with the fitting third portion is coated with the adhesive. In other example embodiments, both the fitting and the composite tube are coated with the adhesive.

A collar 19 which is preformed from a composite material as shown in FIG. 2 is used as a bolstering structure. In an example embodiment, an inner surface 218 of the collar may be tapered at an angle 1500, relative to a central longitudinal axis 1502 of the fitting complementary to a tapered angle 1504 defined by the outer surface of the end portion 150 of the tube relative to a central longitudinal axis 1506 of the tube, which is defined when the end portion is reduced in size to engage the tapered outer surface section 1284 of the fitting. In the example embodiment shown in FIG. 2, the inner surface taper angle 1500 of the collar is the same as the tube end portion 150 outer surface portion taper angle 1504 of the tube. In other example embodiments, the taper angle 1500 of the inner surface of the collar is not the same as the taper angle 1504 of the outer surface of the portion 150 of the tube. In some embodiments, the inner surface 218 of the collar may be non-linearly tapered. In an example embodiment, the collar is made from carbon fibers and a polymer or epoxy matrix.

In one example embodiment, after the tube is mated to the fitting, the collar is axially slid over the fitting first end portion 122 and over the flange 126 to engage and press on the outer surface 312 of the tube 10.

In an example embodiment, after the tube is sealed to the fitting, the collar is axially slid over the fitting first end portion 122 and over the flange 126 to mate and press on the outer surface 312 of the tube 10. The axial load required to slide the collar over the fitting and tube is referred to herein as the "axial press load." As the collar with the tapered inner surface 218 is slid over the end of the fitting first and portion 122 and over the flange 126, it engages the outer surface of the portion of the tube portion 150 fitted over the tapered surface of the fitting. As the collar is further slid, it further engages and provides further radial pressure against the portion 150 of the tube fitted over the tapered outer surface of the fitting. In an example embodiment, the collar is slid far enough so as to not cover the edge surface 127 of the flange 126. In another example embodiment, however as shown in FIG. 2, the collar is slid far enough so it surrounds at least a portion of each of the flange edge surface 127 and at least a portion of the end portion 150 outer surface 312 of the tube. In an example embodiment, the collar surrounds axially and circumferentially the entire flange edge surface 127. The collar enhances the integrity and/or strength of the connection between the fitting and the tube end. Furthermore, it is expected that this configuration may be strong enough such that another part of the tube may fail during axial load before the connection between the tube and the fitting.

Figure 6A:
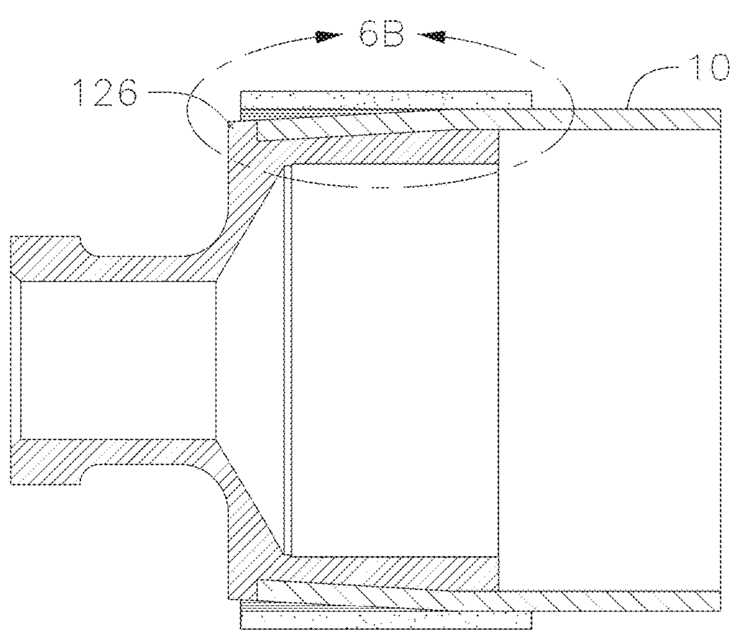
FIG. 6A is a partial cross-sectional view of a fitting inserted into a tube end and an example embodiment collar mounted over the tube end.
Figure 6B:
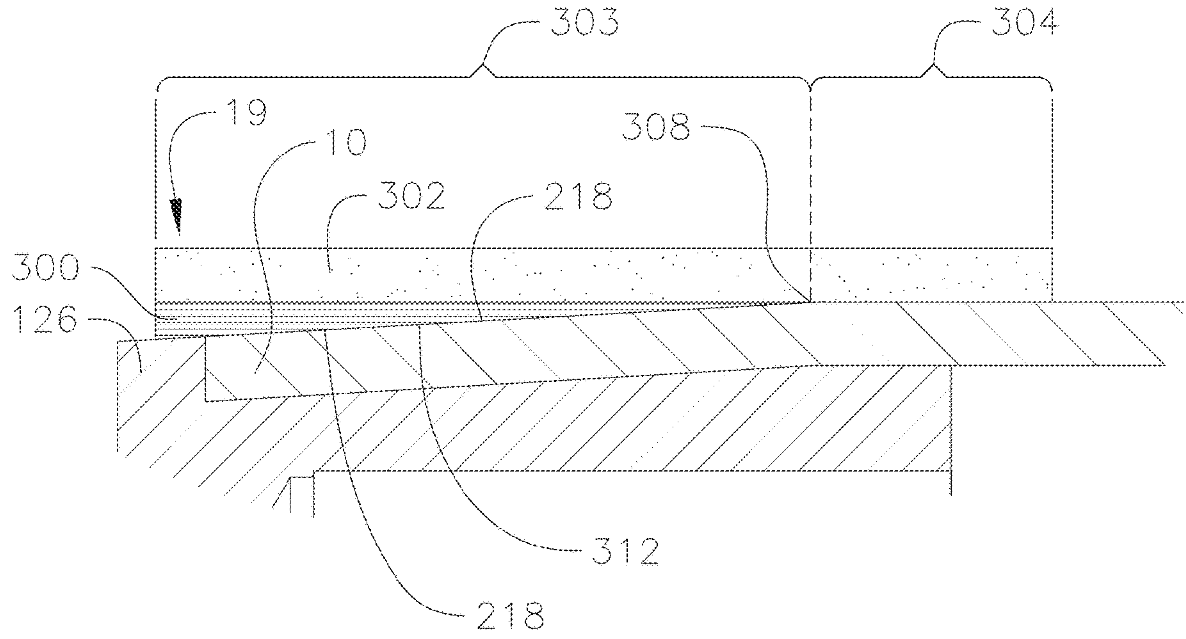
FIG. 6B is a partial cross-sectional view of section 6B shown in FIG. 6A.

As shown in the example embodiments shown in FIGS. 6A and 6B, the collar includes a filler section 300 which fills in the volume created by the reduction in size of the tube end portion 150. In the shown example embodiment, the filler section is triangular in cross-section. Over the filler section is a hoop section 302, which in the shown example embodiment, is rectangular in cross-section. In the shown example embodiment, the hoop section 302 has a first portion 303 extending over the filler section and a second portion 304 extending axially beyond the filler section and directly over the tube. In an example embodiment, the filler section is formed from fibers substantially all or entirely all of which are 0° fibers, i.e., fibers that extend in the longitudinal direction (i.e., parallel to the central longitudinal axis of 1506 of the fitting). In the hoop section, all or substantially all the fibers are oriented primarily in a 90° direction for hoop strength (i.e., perpendicular to the longitudinal direction). In an example embodiment, more than 50% of the fibers are orientated in a 90% direction. In another example embodiment, more than 80% of the fibers are oriented in a 90% direction. In a further example embodiment, more than 90% of the fibers are oriented in a 90% direction.

In some embodiments, the hoop section has multiple layers of 90° fibers, as well as layers formed from varying angles of the fibers. In addition, in the interface between the filler section and the hoop section, the fibers in the hoop sections may gradually transition to zero degree, as they approach the filler section to alleviate interlaminate stresses. When the collar is applied over the tube, the hoop section is under hoop stress and produces an even compressive force within the filler section, which is beneficial in reducing slip load. In the example embodiment where the portion 304 of the hoop section extends axially beyond the filler section, such portion 304 is not subject to any significant stress. It may be used primarily for cosmetic or environmental sealing. In an example embodiment, the hoop section second portion 304 is formed to have a clearance fit over the outer diameter of the tube body. In this regard, the hoop section second portion 304 is not stressed.

Because all or substantially all the fibers are oriented at 0°, hoop strength in the filler section 300 is afforded by the resin system. This is minimal compared to the hoop strength of the hoop section, which includes the 90° fibers. As a result, by keeping the interference between the tapered surface 218 of the filler section 300 (e.g., the tapered inner surface of the collar) and the tapered outer surface 312 of the tube relatively consistent, then the compressive load, along both tapers is relatively consistent. If the filler section, as for example, were to have fiber directions with more significant hoop strength, as for example fibers oriented in the 90° direction, the stress would be greater in the direction of further reduction of diameter or more hoop strength would be present. In addition, the 0° fibers in the filler section are more compliant during the collar application, thus reducing local stress concentrations that can result from small local variations in the surface of the tube. This has the effect of protecting the hoop section where stress concentrations may lead to premature failure.

A point 308 where the filler section, hoop and section first and second portion meet is the inflection point where the taper of the filler section begins or where the constant diameter surface of the insert begins to reduce in diameter. If for design purposes a variable stress is required throughout the filler section, the interference can be adjusted by varying the inner diameter (ID) of the collar inner tapered surface 218 to achieve the desired local stress. For example, if higher stress is required the ID of the collar taper may be further reduced to provide a greater stress. By maintaining a consistent and/or predictable interference between the collar and the tube, the stress level of the hoop section, and therefore the filler section can be fine-tuned to an optimum desired level. This can be confirmed with strain gauges placed over or within the hoop section. Once correlation between the axial press load on of the collar and the stress achieved is determined for a particular collar/tube interface, then the strain gauges can be omitted.

In other example embodiments, the outer surface 312 of the tube 10 that interfaces with the collar is reduced in thickness forming a reduced thickness section 400. The reduced thickness section may be linearly or not linearly tapered, may include multiple sections some of which may be tapered and some which are constant thickness sections. In the example embodiments shown in FIGS. 7A and 7B, the tube reduced thickness section 400 has two axial portions: a first decreasing thickness portion 402; and a second constant thickness portion 404 extending from the first portion. Both portions have tapered outer surfaces 406, and 408, respectively. With these example embodiments the collar may be provided with a third section 330 radially between the filler section 300 and the hoop section 302. In the example embodiments shown in FIGS. 7A and 7B, the collar third section is a second filler section 332 in that it also contains fibers and all or substantially all fibers are fibers that are longitudinal in that they are oriented at 0°. In other example embodiments the second section may have other fiber orientations, as for example a mix of 0° fibers and 90° fibers. In one example embodiment the fibers in the third section closer to the hoop section are 90° fibers and the fibers in the third section closest to the filler section are 0° fibers.

Figures 7A, 7B:
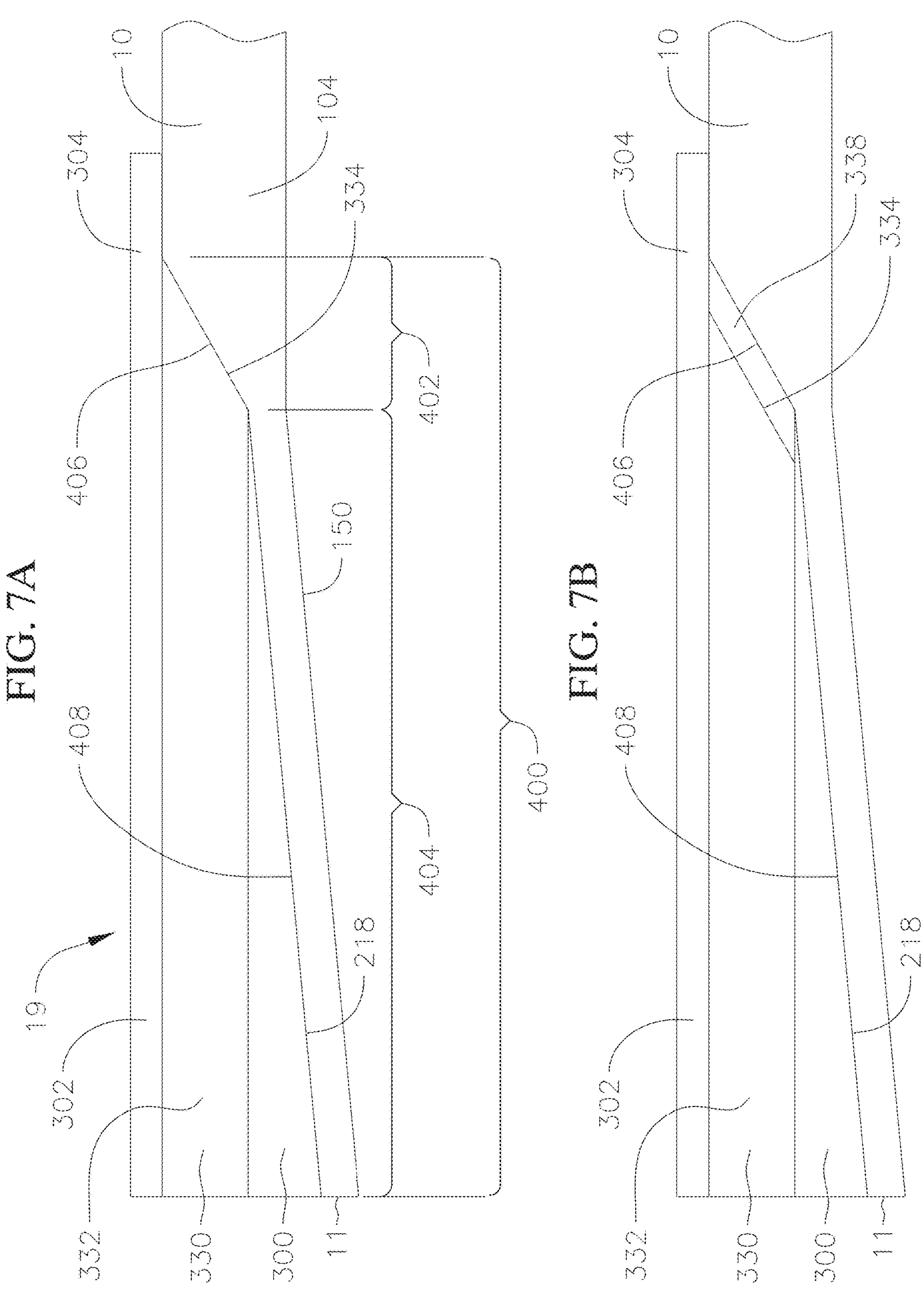
FIGS. 7A, 7B, and 8 are partial cross-sectional views of an example embodiment collar interfacing with example embodiment tube ends. The fittings are omitted.

In example embodiments as shown in FIGS. 7A and 7B, the collar third section includes a tapered surface 334. In the shown example embodiments, the tapered surface 334 extends axially beyond the tapered surface 218 of the filler section. The collar third section tapered surface 334 may be linear or non-linear. For example, the tapered surface 334 may have a curvature. In one example embodiment the collar third section tapered surface 334 is complementary to the tube tapered outer surface 406.

In the example embodiment shown in FIG. 7A, the collar is slid over the tube portion 150 until the collar third section tapered surface 334 mates with the tube tapered outer surface 406 and the filler section tapered surface 218 mates with the tube tapered surface 408. The second portion 304 of the hoop section 302 extends directly over the tube. In another example embodiment, the collar is slid far enough over the tube so that a gap 338 exists between the collar third section tapered surface 334 and the tube tapered outer surface 406, as for example shown in FIG. 7B. With this embodiment the filler section tapered surface 218 mates with the tube tapered surface 408 and the second portion 304 of the hoop section 302 extends directly over the gap and the tube.

Figure 8:
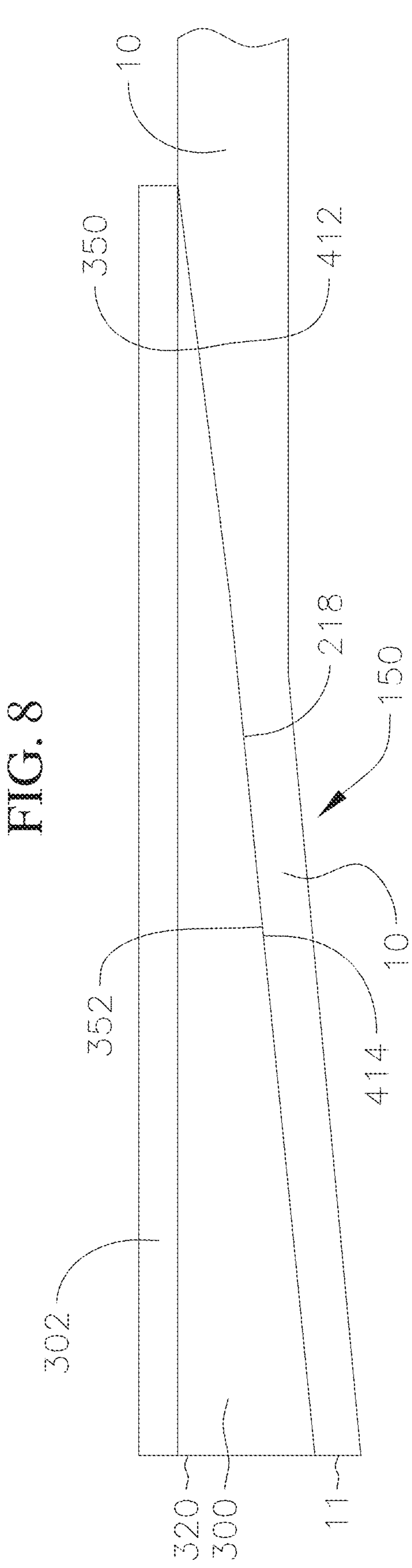

In another example embodiment as shown in FIG. 8, the collar tapered inner surface 218 has a variable taper where the taper smoothly transitions from a first taper 350 to a second taper 352 in an axial direction toward the end 11 of the tube receiving the fitting. With this embodiment the tube end portion 150 may have complementary surfaces 412, 414, respectively interfacing with the collar first and second tapers 350, 352, respectively. As can be seen in the embodiment shown in FIG. 8, the collar section 302 does not have a second portion 304 extending over a portion of the tube that is not reduced in diameter.

In an example embodiment, the structural adhesive between the formed tube and the insert has high compressive properties. In one example embodiment, the adhesive used has a compressive strength of 7,700 psi with a room temperature cure and 21,000 psi with an accelerated cure. This is compared to a 4,500 psi tensile lap shear strength. Applicants have discovered that it is beneficial to aggressively preload this interface in compression. This can be done through increasing tensile hoop stress on the collar. By preloading the interface, the structural adhesive is stressed in compression along the formed taper which makes it less dependent upon the relatively low lap shear strength. At lower preloads, Applicants discovered dramatic reductions in bond line strength particularly in tensile loading due to the increased reliance on the adhesives relatively lower lap shear strength.

Preloading the interface in compression may be done using various methods. In a first example embodiment, it is accomplished through controlling the collar axially displaced location only. With this approach, the goal is to locate the collar and leave the hoop stress as an undefined variable. This practice results in a variable limit and ultimate failure load. Variations in taper dimensions make this method less precise than the next two. In a second example embodiment, preloading is accomplished through a set axial force. This is a good improvement over the axial displacement method. By guaranteeing that the press on force is the same for each collar application the resultant hoop stress can be controlled with more accuracy. Other factors such as variable taper friction, rate of collar application and the variation between static and kinetic coefficients of friction still introduce significant variables to this method. In a third example embodiment, preloading is controlled through a set hoop stress. By placing strain gauges on the collar, the precise collar preload can be determined.

In the past the collar was pushed on only to a specific displacement/location relative to the fitting with no regard to the tensile hoop stress or the resulting compressive preload under the collar. In an example embodiment, an axial press load is used which may be used in conjunction with a strain gage to determine if the desired stress level has been achieved. In an example embodiment, the exact displacement/location of the collar is secondary to final hoop stress of placed collar. During loading of the assembly, while in use, the collar will be subject to additional stress which must be considered in the design.

With this example embodiment collar, Applicants have discovered they consistently drive the tensile failure mode of the interface between the tube and the fitting collar. The collars may provide sufficient hoop load on the tube and fitting when they are inserted a specific amount over the tube and corresponding fitting to provide sufficient holding strength to the tube and fitting, as for example when an end of the collar 320 is flush with a free end 11 of the tube. Applicants have discovered that the example embodiment collars may be pressed with a predetermined axial press load which slides them sufficiently over the tube and corresponding fitting to consistently provide desired holding strength to the tube and against the fitting. As previously discussed, in an example embodiment, the axial press load is determined by correlating the desired stress level of the collar hoop section, which may be determined by measuring strain using strain gauges, to the axial press load required to achieve such hoop section desired stress load.

Strain gauges can be applied externally to the outside of the collar and removed after collar application. They can also be embedded in the collar layup where they become a permanent part of the structure. Strain in the 90° direction is the most critical so at least one strain gauge will always be oriented in that direction. If trying to confirm or quantify a constant stress (or purposefully variable stress) along the collar multiple strain gauges are placed along one side (same angular location) of the collar all oriented in the 90° direction. Additional strain gauges can be placed in a 0° orientation and/or any angle between 0° and 90° for additional clarity of the stress state of the collar.

In one example embodiment strain gauges are mounted on the collar to measure strain in the hoop direction. An axial press load is applied to slide the collar tapered inner surface over the tapered outer surface of the tube. The axial press load is applied up to a level where the strain in the hoop direction as measured by the strain gauge is at an optimum level. In an example embodiment, the hoop strain is at an optimum level when the hoop stress on the collar is about 50% of the ultimate hoop stress of the collar. In other embodiments, the ultimate strain level occurs when at greater the hoop stress on the collar is greater than 50% of the ultimate hoop stress. Once at the optimum hoop strain, the axial press load is removed and the collar is adhered or otherwise fixed to the tube and fitting.

Strain gauges can also be used in conjunction with the set axial force collar application method. Through development testing the set hoop stress collar application method can be used while observing the axial force and displacement rate used to apply the collar. If a correlation can be established between the collar press on force and the resultant hoop stress, the collar can be applied in the future with the set axial force known to provide the ideal hoop stress.

The term “generally triangular” as used herein refer to a triangular shape and to a triangular shape that may have small variations, as for example one or more sides of the triangle may be non-linear, e.g. curving. Similarly, the term “generally rectangular” as used herein refer to a rectangular or square shape and to a rectangular or square shape that may have small variations, as for example one side or more sides of the rectangle or square may be non-linear, e.g. curving.

Figure 9:
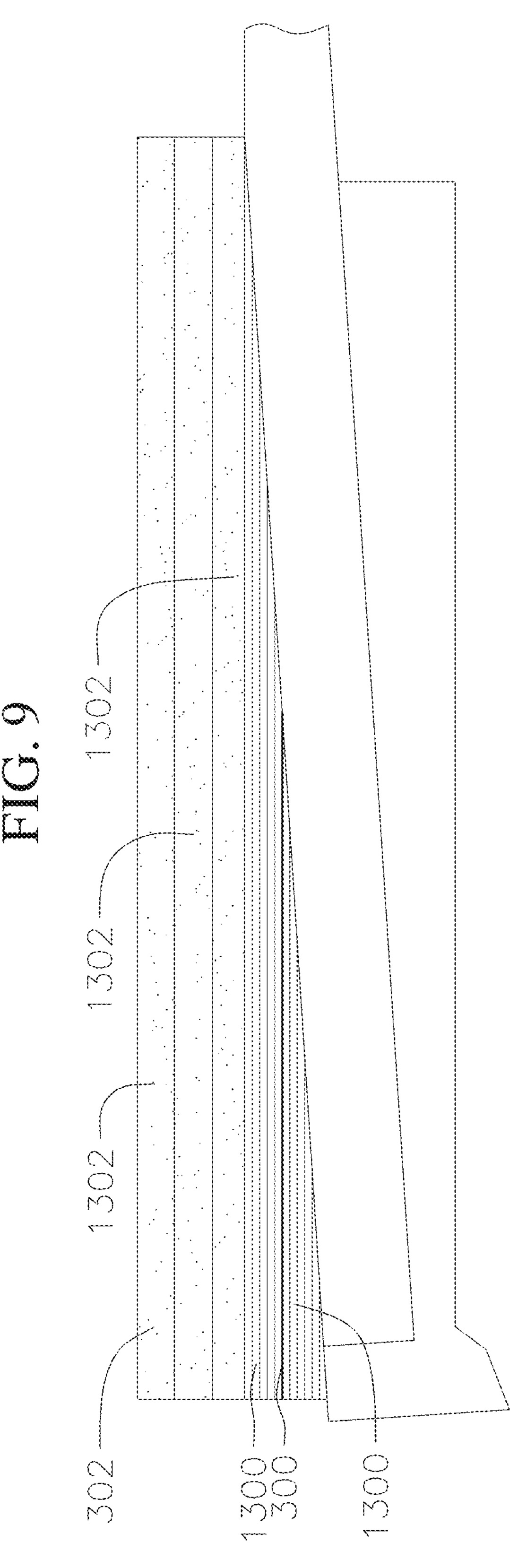
FIG. 9 is a partial cross-sectional view of the fitting and example embodiment collar as shown in FIG. 6B, incorporating a collar hoop section that is formed separate from the collar filler section and where each of the hoop and filler section is formed from multiple sub-sections.

Although the present invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the claims supported by this application and their equivalents rather than the foregoing description. For example, in other example embodiments, as for example shown in FIG. 9, the filler section 300 is formed separately from the hoop section 302 and the hoop section is bonded over the filler section. In other example embodiments also as shown FIG. 9, the hoop section may be formed from separate tubular sub-sections 1302, one over the other, and the filler section may formed from separate tubular sub-sections 1300, one over the other. Each tubular sub-section of the hoop section and the filler section and the hoop section and filler section may be bonded with each other using an adhesive. In an example embodiment, adhesives are used that have lubricant qualities before curing that would allow one sub-section (and/or section) to glide over one another. An example embodiment adhesive is Hysol X adhesive. Also the sections and sub-sections may be fiber reinforced composites including a thermoset or a thermoplastic resin or may be liquid molded and fiber reinforced. Applicants have discovered by forming the filler and the hoop sections separately and then attaching the hoop section over the filler section, cracks that may initiate at the filler section do not propagate into the hoop section. Similarly, cracks that may initiate in the hoop section do not propagate into the filler section. The interface between the filler and hoop section act as a crack arrestor. Cracks are more likely to initiate at the filler section, especially as the filler section thickness increases.

What is claimed is:

1. An annular collar for applying a radial compressive force to an outer surface of a tube, said collar comprising:

a first end axially opposite a second end; and an inner surface, wherein the collar in cross-section as viewed along a plane extending axially along a diameter of the collar comprises a first section and a second section radially adjacent to the first section, wherein the second section surrounds the first section, wherein the collar comprises a fiber reinforced composite comprising fibers and resin, wherein fibers forming one of the first and second sections are oriented along a hoop direction, and wherein the other of the first and second sections comprises fibers oriented generally transverse to the hoop direction.

2. The collar of claim 1, wherein substantially all fibers forming the second section are oriented in said hoop direction.

3. The collar of claim 1, wherein said one of the first and second sections having fibers oriented along said hoop direction is the second section.

4. The collar of claim 3, wherein said first section is generally triangular in said cross-section defining a tapered surface reducing in diameter in an axial direction, and wherein the collar is thicker at a first end and thinner at a second end.

5. The collar of claim 4, wherein said first section is formed by substantially all of said fibers forming said first section being axially oriented.

6. The collar of claim 5, wherein the tapered surface comprises two tapered surface portions tapering at different angles in cross-section as measured along the axially extending plane.

7. The collar of claim 4, wherein the tapered surface comprises two tapered surface portions tapering at different angles in cross-section as measured along the axially extending plane.

8. The collar of claim 1, wherein said one of said first and second sections is generally triangular in said cross-section defining a tapered surface reducing in diameter in an axial direction.

9. The collar of claim 8, wherein said one of said first and second sections being generally triangular in said cross-section is formed by substantially all of said fibers forming said generally triangular section being axially oriented.

10. The collar of claim 9, wherein the tapered surface comprises two tapered surface portions tapering at different angles in cross-section as measured along the axially extending plane.

11. The collar of claim 8, wherein the tapered surface comprises two tapered surface portions tapering at different angles in cross-section as measured along the axially extending plane.

12. A tube assembly comprising:

a fitting having a first end opposite a second end;

at least a section of the fitting having an annular outer tapered surface reducing in diameter in a direction axially along an axial direction toward one of said first and second ends;

a tube having a portion over the annular outer tapered surface, said portion having an outer surface tapering from a larger outer diameter to a smaller outer diameter; and an annular collar having an inner surface over an outer surface of the portion of the tube, wherein the collar in cross-section as viewed along a plane extending axially along a diameter of the collar comprises a first section and a second section radially adjacent to the first section, wherein the second section surrounds the first section, wherein said collar comprises a fiber reinforced composite material comprising fibers and resin, wherein fibers forming one of the first and second sections are oriented along a hoop direction, and wherein the other of the first and second sections comprises fibers oriented generally transverse to the hoop direction.

13. The tube assembly of claim 12, wherein said one of the first and second sections having fibers oriented along said hoop direction is the second section, wherein the first section is generally triangular in said cross-section defining a tapered surface reducing in diameter in an axial direction, wherein the collar is thicker at a first end and thinner at a second end, wherein said thicker end surrounds said tube portion outer surface at, or proximate, the larger outer diameter and said thinner end surrounds said tube portion outer surface at, or proximate, the smaller diameter.

14. The tube assembly of claim 13, wherein substantially all fibers forming the second section are oriented in said hoop direction.

15. The tube assembly of claim 14, wherein the tapered surface comprises two tapered surface portions tapering at different angles in cross-section as measured along the axially extending plane.

16. The tube assembly of claim 13, wherein said first section is formed by substantially all of said fibers forming said first section being axially oriented.

17. The tube assembly of claim 16, wherein the tapered surface comprises two tapered surface portions tapering at different angles in cross-section as measured along the axially extending plane.

* * * * *